United States Patent
Van Luchene et al.

(10) Patent No.: US 7,775,885 B2
(45) Date of Patent: Aug. 17, 2010

(54) EVENT-DRIVEN ALTERATION OF AVATARS

(75) Inventors: Andrew S. Van Luchene, Santa Fe, NM (US); Raymond J. Mueller, Palm Beach Gardens, FL (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 284 days.

(21) Appl. No.: 11/694,648

(22) Filed: Mar. 30, 2007

(65) Prior Publication Data

US 2007/0218987 A1 Sep. 20, 2007

Related U.S. Application Data

(63) Continuation-in-part of application No. 11/368,143, filed on Mar. 3, 2006, now Pat. No. 7,677,974, and a continuation-in-part of application No. 11/421,025, filed on May 30, 2006, now Pat. No. 7,690,990.

(60) Provisional application No. 60/727,121, filed on Oct. 14, 2005.

(51) Int. Cl.
*G06F 17/00* (2006.01)

(52) U.S. Cl. ...................................................... 463/42
(58) Field of Classification Search ............. 463/16–20, 463/42; 705/1
See application file for complete search history.

(56) References Cited

U.S. PATENT DOCUMENTS

| | | | |
|---|---|---|---|
| 2006/0178899 A1* | 8/2006 | Jung et al. | 705/1 |
| 2006/0178964 A1* | 8/2006 | Jung et al. | 705/35 |
| 2006/0178965 A1* | 8/2006 | Jung et al. | 705/35 |
| 2006/0190284 A1* | 8/2006 | Jung et al. | 705/1 |
| 2007/0143119 A1* | 6/2007 | Jung et al. | 705/1 |

OTHER PUBLICATIONS

Fable (game) by Microsoft released Sep. 14, 2004 from <URL:http://xbox.ign.com/articles/542/542632p1.html> pp. 1, 3, 4, 6 and 7.

* cited by examiner

*Primary Examiner*—Ronald Laneau

(57) ABSTRACT

Virtual environments in which player avatars can be altered based on events that occur in a video game, metaverse or virtual environment. One event is the failure to fulfill an obligation in a virtual contract. Avatars who fail to fulfill such obligations may have their appearance, voice, or smell altered, or may be followed by one or more non player character avatars.

17 Claims, 1 Drawing Sheet

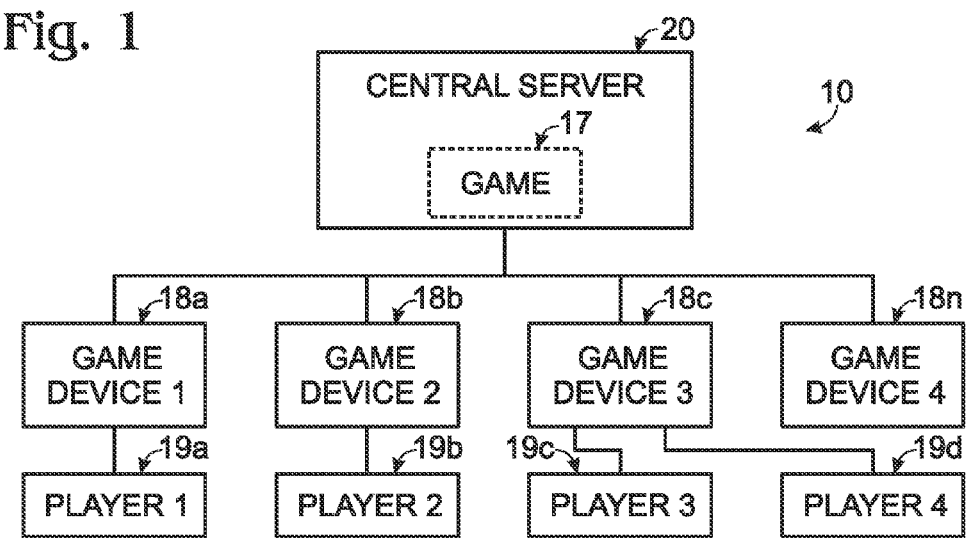

EVENT-DRIVEN ALTERATION OF AVATARS

PRIORITY CLAIM

The following application is a continuation-in-part of U.S. patent application Ser. No. 11/368,143, filed Mar. 3, 2006 and Ser. No. 11/421,025, filed May 30, 2006, each of which claim the benefit of U.S. Provisional Patent Application No. 60/727,121, filed Oct. 14, 2005, each which is hereby incorporated by reference.

BACKGROUND

Virtual Environments which are accessible to multiple subscribers via a server are well known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community. Virtual communities like Linden Lab's "Second Life" provide a three-dimensional metaverse in which people (who may or may not pay a fee for the right to access the metaverse) create avatars that are able to interact with other avatars as well as the local environment. It would be advantageous to provide improved methods and apparatus for increasing the enjoyment and/or longevity of these virtual environments.

BRIEF DESCRIPTION OF THE DRAWINGS

FIG. 1 illustrates a network system according to an embodiment.

DETAILED DESCRIPTION

Massive multi player online games (MMOGs) or massive multi-player role-playing games (MMORPGs) are computer game which are capable of supporting hundreds, thousands, or millions of players simultaneously. Typically, this type of game is played in a giant persistent world where the game continues playing regardless of whether or not real players are logged in. Players commonly access these games through a network such as the Internet, and may or may not be required to purchase additional software or hardware in order to play the game. Such networks allow for people all over the world to participate and interact with each other in a virtual environment. The present disclosure provides systems and methods which contribute to the evolution and longevity of such a game. According to various embodiments, the present disclosure provides various event-driven mechanisms for avatar alteration in a metaverse.

Accordingly, the present disclosure provides various methods and systems which are suitable for use in a virtual metaverse. As used herein, the term "virtual" includes the concept "in a computer-generated environment or other intangible space." Further more, a "metaverse" includes a collection of online virtual environments which are accessible to one or more players of one or more online games or communities. In some embodiments, certain areas in a metaverse may be restricted to some players. Examples of metaverses include Massive Multi Player Online Video Game (MMPOVGs) such as World of Warcraft and virtual communities such as Second Life.

MMPOVGs (sometimes referred to as Massive Multi Player Online Role Playing Games MMPORPGs) include video games and virtual environments that are provided by and accessed via at least two video game consoles connected to a Video Game Central Server via a network such as an internet or intranet, or as part of a peer-to-peer network including at least two Video Game Consoles. In some embodiments, players create and/or control characters that may interact with each and their surrounding virtual environment in a Metaverse that is stored on the Video Game Central Server and/or the Video Game Consoles.

According to numerous embodiments, in order to access a particular, metaverse, virtual environment, or game, a video game console Video Game Central may be in electronic communication with a video game server. A video game server may include a CPU, memory, and permanent or temporary storage and be in electronic communication with multiple players via multiple video game consoles. As such, the plurality of players are able to interact with each other as well as the metaverse by accessing the video game server via their video game consoles.

Referring to FIG. 1, a network system 10 according to one embodiment includes a central server 20 in communication with a plurality of video game consoles or playing units 18. Those of ordinary skill in the art will appreciate that any number of video game playing units may be in communication with the central server. Typically, the number of video game playing units changes at various times as players join games and as players stop playing games. Similarly, more than one server may operate to coordinate the activities of the video game playing units, as is well known in the art.

Central server 20 may comprise any computing device (e.g., one or more computers) capable of communicating with other computing devices. The server 20 typically comprises a processor which is in communication with a storage device, such as an appropriate combination of RAM, ROM, hard disk, and other well known storage media. Central server 20 may comprise one or more personal computers, web servers, dedicated game servers, video game consoles, any combination of the foregoing, or the like.

Each video game device 18 may comprise any device capable of communicating with central server 20, providing video game information to a player, and transmitting the player's desired actions to the central server. Each video game device typically comprises a processor which is in communication with a storage device, such as an appropriate combination of RAM, ROM, hard disk, and other well known storage media. Suitable video game devices include, but are not limited to, personal computers, video game consoles, mobile phones, and personal data assistants (PDAs).

Some or all of video game 17 can be stored on central server 20. Alternatively, some or all of video game 17 may be stored on the individual video game devices 18. Typically, the video game devices are able to communicate with one another. Such communication may or may not be facilitated by central server 20. Accordingly, a player 19a accessing video game 17 via game device 18a may be able to play with a player 19b accessing video game 17 via game device 18b. As shown, it may be possible for multiple players (e.g. 19c, 19d) to access central server 20 via the same game device (e.g. 18c).

Regardless of whether video game 17 is stored on central server 20 or video game devices 18, server 20 is typically configured to facilitate play of the game between multiple game players.

The games and metaverses wherein these games take place are typically accessible to player via a video game console. For the purposes of the present disclosure, "video game consoles" include devices comprising a CPU, memory, and optional permanent storage residing at a player location that can allow for the playing of video games. Examples include, home PCs, Microsoft Xbox, and Sony Playstation, Wii, Playstation portable, etc. Dedicated video game consoles may be useful for only playing video games, while multifunctional video game consoles, such as personal computers, PDA's and the like may be useful for performing multiple tasks including, but not limited to playing video games.

As stated above, a particular metaverse may include one or more virtual or game environments. For the purposes of the present disclosure the terms "virtual environment," "game environment" and the like include a region, sub-region or area of a metaverse such as a country, city, era, building, etc., which is in some way recognizably different from another region, sub-region, or area of the metaverse.

It will be understood that a "game" as used herein need not be a "game" in the traditional sense of a competition in which a winner and/or loser is determined, but rather that the term "game" incorporates the idea of the metaverse regardless of the intended purpose. Accordingly, both World of Warcraft and Second Life would be referred to as games for the purposes of the present disclosure. Moreover, a person or entity who enters the metaverse in order to conduct business, tour the metaverse, or simply interact with others or the virtual environment, with or without competing against another entity is still considered to be "playing a game."

A genetic algorithm may include any software application or module that can improve results with use. Use and applications of rules based, expert systems and/or genetic algorithms are well known in the prior art and may be implemented using any applicable means. For example, methods to develop rules, expert systems and/or genetic algorithms are discussed and disclosed in various issued and pending patents and reference and other materials, including the following books entitled: "Genetic Algorithms in Search, Optimization, and Machine Learning", by David E. Goldberg, and "An Introduction to Genetic Algorithms," by Melanie Mitchell, and "Expert Systems: Design and Development," by John Durkin," and "Logical Foundations for Rule-Based Systems (Studies in Computational Intelligence)," by Antoni Ligeza, each and all of which are incorporated herein by reference.

A plug-in includes any software application or module or one or more computer instructions, which may or may not be in communication with other software applications or modules, and may include any file, image, graphic, icon, audio, video or any other attachment. Plug-ins may be comprised of any one or more set of computer instructions using any computer programming language.

Furthermore, the term "player" includes any entity that accesses the metaverse, regardless of whether or not the player intends to or is capable of competing against other players. Typically, a player will register an account with a Video Game Central Server or within a peer-to-peer network and create Characters that can interact with other Characters in a Video Game Environment. The term "character" includes persona created by a player in a metaverse, while an avatar" includes the physical embodiment of a character in the metaverse.

According to one or more embodiments, the game server may be configured to maintain, host, and/or be in communication with a character account for each character that accesses the metaverse. A character account includes information related to a particular character. Accordingly, a character account may be a program and/or database that tracks various character related data including, but not necessarily limited to, character attributes.

For the purposes of the present disclosure, a character attribute may include any quality, trait, feature or characteristic a particular Character can have. Examples of character attributes include, but are not limited to:
1. A score
2. Possession, ownership, control, etc. of a virtual object
3. Character Skills and abilities—which may be inherent or acquired, and include but are not limited to: the ability to cast certain spells, foretell the future, read minds, use certain weapons, cook, hunt, find herbs, assemble herbs into potions, mine, assemble objects into other objects, fly, and/or enchant other player characters.
4. Physical appearance
5. An emblem or mark
6. A synthetic voice, which an audible signal that is recognized as speech or song. A synthetic voice may be a recording of a real person speaking, or may be generated electronically. In come embodiments, a synthetic voice may be a celebrity voice. In some embodiments, a celebrity voice may be a voice, the sound of which is or would be recognizable by a statistically significant percentage of the target audience. Examples of celebrity voices include the voices of real life celebrities such as famous actors, politicians, singers and other celebrities (e.g. James Earl Jones, Richard Nixon, Ellen DeGeneres) as well as famous characters such as Bart Simpson, and Bugs Bunny. A Celebrity Voice may be spoken by a real life celebrity, spoken by a celebrity voice impersonator, or created or enhanced using electronic means.
7. Possession, ownership, control, etc. of virtual tangible or intangible assets such as virtual money
8. Virtual help points or credits
9. The ability to join groups of other players at a later time
10. A score for subsequent matching of later game parameters
11. A relationship with another character
12. A genetic profile or makeup These character attributes may or may not change during a character life. The term "character life" may include the fixed period of virtual or real world time that a player character can exist in a game environment.

According to some embodiments, the game server may maintain, host and/or be in communication with a player account for each player that accesses the metaverse. A player who controls more than one character in the same metaverse may have one or more player account. The player account may, for example, contain a player profile including player-related information such as player attributes, billing, and character account information. Suitable billing information may include any information pertaining to billing a player including, but not limited to, a billing address, credit card account, bank account, pay pal account or other payment information. Player attributes may include, but are not be limited to:
1. Real Money Account information
2. Discount of monthly fees for playing game
3. Monthly fee for playing a game
4. Global character attribute settings for all characters created by player across multiple games.

5. Rewards for encouraging another player to signup to play

The games described herein frequently make use of Non-Player Characters (NPC) or Computer Generated Characters (CGC), for example, to perform various tasks, act as background or scenery in various scenarios, act as victims, or villains, or for any other reason. Generally, the terms NPCs and CGCs include any character that is controlled by the system rather than being controlled by a player. However, under certain conditions NPCs or CGCs may be controlled by one or more players.

According to many embodiments, avatars in a metaverse attempt to complete, negotiate, beat, or experience one or more game parameters. Examples of game parameters include, but are not limited to:
1. Completing all or part of a mission in a game
2. Playing for a certain period of time
3. Winning a match against another player character or computer generated character
4. Reaching a certain level or score
5. using or obtaining an ability or technology
6. kill/death ratios
7. obtaining an object
8. solving a puzzle
9. accuracy with weapons
10. effective use of the proper weapon
11. killing a certain character/creature
12. getting through or to a certain geographic area
13. decreasing or increasing Karma Points
14. getting, buying, exchanging or learning a new skill or player attribute
15. having a child
16. getting married
17. obtaining, buying, trading, producing or developing raw materials
18. producing goods or services
19. earning income
20. earning a higher rank in an army
21. winning an election among two or more player characters
22. achieving deity status
23. improving player character status or caste
24. assisting other player characters with any of the above
25. speed of accomplishing any of the above
26. and/or any part of a metaverse experience by which characters can be measured.

According to some embodiments, two or more characters, players, entities, etc. may decide to enter into an enforceable agreement such as a virtual contract. Some examples of virtual contracts and methods by which they may be created and enforced are provided in U.S. Provisional Patent Application Ser. No. 60/652,036, and U.S. patent application Ser. Nos. 11/355,232, 11/624,662, 11/611,050, and 11/279,991 which hereby incorporated by reference.

One example of a virtual contract may be a player to player Contract which may be a binding contract between player characters that allows the players to provide or exchange game attributes to one another. In some embodiments, once a player-to-player contract is established, the game server or peer-to-peer network automatically distributes game attributes between the player characters based on the contract conditions.

According to various embodiments, players may desire to trade, sell, loan, etc. various in-game items. Accordingly, a particular metaverse or game environment may include an in-game Marketplace wherein players and characters can exchange goods and services including, but not limited to, items, attributes, contracts, etc. Exemplary exchanges for use in virtual environments are described, for example, in U.S. patent application Ser. No. 11/560,456, which is hereby incorporated by reference.

According to some embodiments, distinctions may be made between players of different experience levels. In such an embodiment, a novice Player may be a player who has spent less than a certain amount of playing time in a given metaverse or game environment and/or who has been flagged or otherwise identified as requiring the help of a more experienced player, such as an expert, to complete a Game Parameter.

As stated above, according to various embodiments, the present disclosure provides various event-driven mechanisms for avatar alteration in a metaverse. An avatar, among other characteristics, may provide the virtual appearance, and/or behavior, or other attributes of a character including the visual appearance, voice, and smell of the character. The term "Player Avatar" includes an avatar controlled by a real or virtual world entity that controls virtual entities in a game environment. A "Negligent Avatar" includes an Avatar whose player or player character has not fulfilled, in whole or in part, one or more real or virtual obligations An avatar's appearance includes the visual appearance of an avatar in the virtual world. An avatar sound includes the sounds emitted and or associated with an avatar in the virtual world. An avatar smell includes the smell or change in smell emitted by the CPU or gaming console or the associated smell generation device, such as iSmell by DigiScents, Inc. of Oakland Calif., of a first player controlling an avatar, or smells emitted by the CPUs, console or smell generation device of players whose avatars interact with or are in the vicinity of the first player's avatar.

As described in greater detail below, avatars may be assessed virtual penalties and rewards based on their performance in the game or other factors. "Virtual Penalties" include any penalty imposed on an avatar that exists in a virtual world, while "Virtual Rewards" include a reward or benefit provided or due to an avatar that exists in a virtual world. A penalty alteration includes an alteration to an avatar based on a virtual penalty while a reward alteration includes an alteration to an avatar based on a virtual reward.

According to some embodiments, avatars may be sponsored. A sponsored avatar may be sponsored by a third party real or virtual person or entity. A Virtual Entity includes any entity in a game environment. A Real World Entity-includes any entity in the real world that can sponsor, create, and or control virtual entities. A Third Party Sponsor includes a real world or virtual entity who can sponsor another virtual entity.

Some embodiments described herein make use of virtual courts. Virtual Court include a virtual space and or time that allows players who are virtual court members to conduct sessions and issue virtual court orders. Virtual Court Orders include a contract or instructions issued by a court to a player that includes obligations, alterations, rewards and penalties. A Virtual Arbiter includes a virtual entity that can perform arbitration sessions between other virtual entities. A Virtual Court System includes a virtual structure that facilitates one or more virtual courts.

According to one or more embodiments, banishment includes the disallowance of a player and/or one or more of a player's avatars or characters from participating in the virtual world on a temporary or permanent basis.

In addition to those characteristics described above, a Celebrity Voice includes the voice of a real world entity that can be copyrighted.

A Synthetic Smell includes any combination of chemicals, natural or synthetic scents, e.g., oils, that, when combined can replicate any one or more natural or synthesized scents.

According to one or more embodiments, a Virtual Collection Agent includes a virtual entity that is licensed or otherwise allowed to issue, accept and or fulfill collection obligations or contracts. A Virtual Bounty Hunter includes a virtual entity that is licensed or otherwise allowed to issue, accept, and or fulfill bounty contracts. A fugitive character includes a character that is flagged as being a fugitive from a virtual entity or virtual obligation.

According to one or more embodiments, the metaverse may allow characters to engage in complicated financial transactions such as loans. Examples of virtual loans and other virtual financial transactions are described, for example, in U.S. patent application Ser. Nos. 11/421,025, 11/559,158, 11/620,542, 11/535,572, 11/535,585, 11/625,225, and 11/625,229, each of which are hereby incorporated by reference. A Virtual Loan Officer may include a virtual entity that is licenses or otherwise allowed to issue, accept and or fulfill loan officer duties. According to a further embodiment, characters may find themselves unable to repay the loans they have taken and forced to enter into virtual bankruptcy. Virtual Bankruptcy may include the bankruptcy of a player character or avatar that is unable to meet one or more of his contractual obligations in the virtual or real world.

As previously stated, the present disclosure provides mechanisms for event-drive avatar alteration. According to one embodiment, the present disclosure provides a system that allows players in a virtual world to configure penalty and reward alterations that are applied to their own avatars other players' avatars based on player, reward and/or penalty specified criteria.

In one embodiment, a system, player, group of players or other duly authorized governing body and/or a game owner uses an administrative tool to configure allowable penalties and rewards. In another embodiment, such penalties and/or rewards are predetermined or established within the game at the start of the game, and/or may be modified throughout or at certain times of game play and/or may be initially established within the game and/or by any person(s) authorized to establish such reward/penalties and/or which may be modified during game play. Such modifications may be made via any applicable means, including, manual or automated means. For example, the system may increase or decrease the extent or frequency of any such rewards or penalties if such changes are determined to be of use or are otherwise desired, e.g., by increasing or decreasing the extent and/or frequency of any such rewards or penalties, the game may be more enjoyable and/or may generate more benefits, such as revenues generated, number of players increases, length of time played increases, feedback from players improves, or any other desired goal or game objective or benefit.

In some embodiments, the game includes rules controlling such rewards and/or penalties and/or two or more players create and/or enter into agreements and otherwise interact with other players via virtual avatars. For example, based on rules and/or virtual contract agreements, players and/or the system can alter the appearance, sounds, and/or smells of another player's avatar. Alterations may be based on fulfilling and or not fulfilling obligations in a virtual contract.

In another embodiment, players can modify their avatars on their own volition or by paying a fee. For example, a player may establish preferred attributes of their avatar and/or return an avatar to its original or preferred condition, e.g., removing a penalty smell by paying a fee to the system, court or player that imposed such smell.

Examples of alterations include, but are not limited to:
1. Altering the appearance of an Avatar including face, body size, body type, face type, face or body shape, weight, appendages, clothing, etc.
2. Altering the voice of an Avatar including the addition of a celebrity voice as disclosed below
3. Interjecting and/or replacing expressions in the spoken or written speech of an Avatar
4. Creating, altering or disallowing the text messages of an avatar
5. Forcing one or more player computers' to emit or stop emitting or changing an emission of one or more smells when or if a player avatar is present or is otherwise approaching or is in the generally same virtual space as an avatar who is being penalized or rewarded, or any combination of the forgoing
6. Altering the ability of an avatar to perform certain tasks
7. Forcing or allowing an avatar to perform certain tasks before they can perform tasks requested by the player controlling them
8. Forcing or allowing the avatar to wear a certain virtual costume or outfit
9. Forcing or allowing the avatar to be fitted with a certain attribute
10. Following or leading the avatar with an NPC such as a jailer or collection agent or a simulated "mother hen"
11. Reducing or increasing the speed or other skills of an Avatar
12. Fitting the Avatar with a device that records his activity and that can notify and alert other characters of those activities.

According to various embodiments, any or all of the above alterations can be applied to the avatar receiving the reward or penalty and/or to the avatars that interact with that avatar.

Alterations can be applied, for example:
1. to a first avatar by a first player or player character. i.e. I can change the way my avatar appears to one or more other avatars.
2. to a second avatar by a first player or player character, i.e. I can change the way your avatar appears to me or one or more other avatars.
3. to other avatars that a second avatar interacts with by a first player or player character, i.e. I can change the way one or more other avatars look to your avatar.
4. to a second avatar as he appears to all or specified other avatars by a first player or player character, i.e. I can change the way your avatar appears to other avatars.

Instances where penalty alteration can be applied to a player avatar include, for example:
1. When a player or player character does not:
   A. Pay a virtual or real world bill
   B. Complete a contracted task
   C. Provide contracted quality
   D. Provide a contracted benefit
   E. Cheats or breaks the rules and laws of a virtual membership
   F. Fails to complete a level or mission of a game environment
   G. Fails to acquire a game attribute in a game environment Instances where reward alteration can be applied to a player avatar include:
1. When a player or player character:
   A. Fulfills a virtual world contract
   B. Completes a level or mission of a game environment
   C. Acquires a game attribute in the game environment
   D. Provides assistance within a game environment E. Makes a charitable donation within a game environment
F. Provides a plug-in or other game improvement
G. Encourages a person to sign up to a game or improve the type of account, e.g., change from standard to premium
H. Exchanges one or more reward points, e.g., credit card points for one or more reward alternations Exemplary methods that provide for the use of credit card secured contracts, credit card rewards, player-to-player contracts are disclosed in U.S. patent application Ser. Nos. 11/279,991, 11/611,050, 11/355,232, and 11/624,662, each of which is hereby incorporated by reference.

According to an embodiment, the present disclosure provides an administrative ("admin") tool that allows a player or group of players or other authorized end users or entities to log in and select or create types of avatar alterations that can be applied to other avatars based on rules or conditions and/or contracts. Using the admin tool an authorized end user, e.g., a player, can select or create a specific alteration such as a celebrity voice, or a mask with jackass ears that can be applied to a player avatar. The player alteration preferences may be stored and included, for example, as settings in contracts created with other player characters.

According to various embodiments, the admin tool can limit the choices of a player based on any one or more of the following including the:
1. level of that player
2. relationships that player has with other players
3. status or skill level of the player or characters associated with the player
4. Account type of the player or characters associated with the player According to yet another embodiment, an alteration creation tool is provided that allows alterations to be created and set up with a licensing structure. For example, a player can create various masks that can be applied to avatars to alter their appearance. The player can also set up a licensing fee that other virtual entities can pay to use the mask to alter the appearance of avatars. Virtual entities can pay or be paid for use of an alteration license. To create an alteration, a player can import image or text files, alter and enhance them, and store them as alterations. Alternatively, players can create alterations using in game tools, third party tools, plug-ins or any other applicable means and store them with licensing agreements for use by other players.

According to yet another embodiment, a virtual court or other duly authorized governing body or automated application can determine that a player has an obligation to fulfill and can force an alteration to be applied to the player's avatar of the player until the obligation has been fulfilled. For instance, an avatar could be forced to say "I am a bad driver" until he has completed a driving school course.

Additional examples of alterations that may be imposed and the conditions for the imposition include, but are not limited to:
1. A character who has failed to make one or more payments when due on a virtual loan can be forced to say "I don't pay my bills" before he can say anything else to another avatar, or before making an offer to purchase any good or service, or before entering into another agreement, etc.
2. A character who does not complete building an virtual item for another player or builds the item with substandard or expected quality can be forced to wear a giant jackass mask until he has fulfilled his obligations and/or pays a fee to remove the mask
3. A character who is sponsored by a credit card company can have the credit card logo embedded on their chest and can glow a certain color
4. A character who is a traitor to his guild can emit an onion scent on the computers of other guild members when his avatar is generally in the same virtual vicinity of other avatars in the guild, or is approaching, or is "upwind" of such other avatars, i.e., when virtual wind is present or could otherwise affect the direction such sent could drift
5. An NPC bill collection agent or NPC "mother hen" can follow a player character who has filed for bankruptcy. The NPC can automatically take a percentage of all revenue generated by the avatar until a penalty amount is obtained and/or such NPC could be a nuisance to the delinquent player character, e.g., by repeating statements over and over to either player character and/or to any other player characters in the vicinity of such delinquent player, e.g., by saying "this guy is a deadbeat and doesn't pay his bills." Such statements may be made any time, all the time, or before, during or after certain events, e.g., just prior to making a purchase, entering into an agreement, bartering goods or services, and/or signing up for a credit card, etc.
6. A character who has cheated on his virtual wife can be fitted with a device that records his activity, which can be viewed and reviewed by his virtual wife.
7. Whenever an Avatar tries to have a conversation with other Avatars, they all tell him to "pay your bills" before they can respond with or say anything else
8. The computer controlling an Avatar who has completed a contract can emit the smell of roses and/or have a "gold star" placed on the avatar's forehead.
9. An avatar who has not paid has taxes to a virtual government can be invisible or altered, e.g. exaggerated to all avatars who are part of that government. Alternatively, all the avatars that are part of a government can be invisible or altered to an avatar who has not paid his taxes to that government
10. A player can purchase a mask to wear when he has an appointment with his virtual psychiatrist that conceals his avatar appearance and identity. The player can purchase this type of alteration for a per minute fee.
11. A player can purchase an avatar alteration so that his virtual interior designer (an NPC or avatar controlled by another player character) looks like Marilyn Monroe during a virtual appointment.

According to various embodiments, the selection of alterations that can be applied to a character who defaults on an obligation can occur when the:
1. system is created, designed, programmed, etc.
2. player sets up his account
3. player creates or modifies a contract
4. player contract is signed or otherwise agreed to
5. obligation of the contract has or has not been fulfilled
6. At any arbitrary time before or during play time in Of course it will be appreciated that the selection of alterations that can be applied to any character can occur at any suitable time during, or outside of, game time.

According to various embodiments, the selection of alterations can be configured or determined by individual players or NPCs, player or NPC guilds, player or NPC families, player or NPC corporations, player or NPC governments, player or NPC courts, or by the game server administrator and/or by rules established within the game.

In an embodiment, the administrative tool allows different penalty configuration settings to be applied based on different administrative privileges. For example, the leader of a guild can select a set of penalties that can be applied to the contracts formed by members of his guild, and the other guild members can select from those penalties when they form virtual contracts with other entities in the game environment.

According to yet another embodiment, an artificial intelligence system can modify the alterations or selection of alterations based on which penalties, when applied, yield the fastest settlement or fulfillment of virtual obligations. Alternatively, a rules based system can tally the time that an obligation is fulfilled based on alterations and modify the available alterations accordingly. Use and applications of rules based, expert systems and/or genetic algorithms are well known in the prior art and may be implemented using any applicable means. For example, methods to develop rules, expert systems and/or genetic algorithms are discussed and disclosed in various issued and pending patents and reference and other materials, including the following books entitled: "Genetic Algorithms in Search, Optimization, and Machine Learning", by David E. Goldberg, and "An Introduction to Genetic Algorithms," by Melanie Mitchell, and "Expert Systems: Design and Development," by John Durkin," and "Logical Foundations for Rule-Based Systems (Studies in Computational Intelligence)," by Antoni Ligeza, each and all of which are incorporated herein by reference.

According to an embodiment, a virtual court system can rule on applying an alteration to a player avatar. The only way the alteration can be reversed or modified is based on an additional court ruling and or the completion of an obligation specified by a virtual court order.

According to yet another embodiment, players can pay a fee for the privilege of attaching alteration penalties or rewards to their contracts in the game. Alternatively or additionally, rather than a character alteration being a penalty, it can be an enhancement for which the player will pay or be paid a fee, or that the player can earn when they reach a certain level of game play or obtain a certain skill in the virtual environment. Examples of how fee-based avatar alterations or enhancements might work include, but are not limited to:
 1. The player or other virtual entity can pay a premium up front or monthly fee to use the character alteration/enhancement files
 2. Each or certain alteration/enhancement file can cost an upfront or monthly fee to use
 3. Every time or certain times a penalty/enhancement clause is added to a contract, a fee can be charged
 4. Every time or certain times a character alteration/enhancement file is used a fee can be charged.

According to various embodiments, fees can be paid or charged to any virtual or real entity or account including, for example, the following:
 1. Players or players accounts
 2. Player characters or player character accounts
 3. Game Server
 4. Third Party Sponsor
 5. Jurisdiction Owner
 6. Guild Leader
 7. Government Leader
 8. Family Member
 9. Virtual Court
 10. Virtual Government
 11. Virtual Jurisdiction According to another embodiment, players can be alerted, for example via an alert system similar to that described in U.S. patent application Ser. No. 11/676,848, which is hereby incorporated by reference, when a portion of a virtual contract has or has not been fulfilled and can log in to their virtual world account to activate the alteration associated with the contract behavior. Alternatively or additionally, alterations can be configured to automatically be applied to character avatars based on virtual contract terms.

According to another embodiment, rather than being able to alter another player avatar based on virtual contract terms, players could acquire game attributes that give them the ability to alter the avatar of another player.

Moreover, according to some embodiments, the right to alter the avatar of another player can be transferred to third parties along with the underlying contract associated with that right.

In some embodiments, the alterations of an avatar can only be visible to some avatars and not others. For example, all the avatars in a guild could see the alteration of an avatar of a guild member, but players outside the guild could not see the alteration. As another example, only the boyfriend of another player character might be able to smell the perfume of his girlfriend.

According to one or more embodiments, an alteration can be applied to a player character, all characters of a player account, or some of the characters of a player account as defined by a contract or the rules of a virtual entity and/or the game.

According to another embodiment, avatar characteristics may be differentiable based on a particular grouping, status, ranking, etc. For example, all avatars controlled by players who have secured their Financial Account in a particular way may have access to or automatically be endowed with a particular avatar alteration or characteristic. As a specific example, a player who uses a certain type of credit card to secure his or her financial account may have certain alteration privileges and/or his avatar can have alterations not available to other avatars. For example, a player using a Citibank credit card to secure his monthly payments to the game server can have access to the alteration of using celebrity voices as his voice in the game. Alternatively, players who agree to display a corporate logo on their avatars can have the right to use a certain database of alterations on their own or other player's avatars.

According to some embodiments, a player can purchase the right to use an alteration on himself or others. These alterations can be bought for a period of time or a number of uses and/or until a certain event occurs or a certain action starts or stops occurring.

In yet another embodiment, the present disclosure provides an alternate voice system using voice recognition. For example, in a massive multi player online gaming experience, players can select, rent, lease, purchase and/or sell one or more synthetic voices for their characters in the game. According to one embodiment, when the player speaks into a headset, his/her natural voice is converted into text using voice recognition software. The text can then be converted back into verbal messages generated by the voice synthesizer using one or more synthetic voices selected by the user. The synthetic voice can be available only if the character has reached a certain level or acquired a certain attribute in the game. The game can be saved along with the converted text and synthetic voice of players, so that the saved game result can be stored, edited and/or turned into a product such as a movie or comic book and/or such records can be used or serve as an audit trail in the event a specific translation requires examination at some future date.

According to some embodiments, the synthetic voice could be a celebrity voice. Furthermore, different celebrities could charge different fees for allowing players to use their voices. The billing system could keep track of usage information, e.g., time used, and fees for each celebrity and pay or deposit such fees to celebrity or other designated accounts, e.g., agency accounts, based on player usage. Fees for using the synthetic speech in the game could be different than fees for using the speech in a saved game result, such as a movie. Fees might also be different for synthesized voices of celebrities vs. fictitious or unknown persons.

According to another embodiment, certain words could be spoken in different celebrity voices by the same character. For instance, certain slogans could be spoken in one voice, while the rest of the speech is spoken in another voice. Certain words, spoken by the synthetic voice of certain celebrities could only be available to characters once they have acquired certain attributes in the game. For example, a player might choose a voice like Julia Childs' for any situations involving cooking, except when the player chooses to say the word "bam" in which instances the system might substitute Emeril Legasse's voice for such word(s).

According to one embodiment, an administrative tool may allow a player to specify what voice he wants to use for particular slogans and catch phrases. The tool may further allow the player to agree to a licensing fee to use the voice. Such tool may also permit the player to select different voices for different times of the day, day of the week, etc., and/or under different circumstances. For example, the player may wish to use one voice when conducting business, another voice when waging war and yet another voice when speaking with players or player characters designated as being of the opposite sex.

According to another embodiment, rather than the character needing to speak into a headset, the system can convert text that is typed into a virtual world chat window into audible voice files. In addition, or in the alternate, players can create voice files of their spoken voice and/or pre-translated celebrity or other synthetic or recorded voices and such players can invoke or otherwise cause such pre-recorded or pre-translated voice/text to be spoken upon request, command or other indication provided by such player and/or automatically based upon one or more rules or predefined situations. Using such pre-recorded voices, previously entered and/or translated text, players can create short phrases and/or complete sentences/paragraphs or entire conversations ahead of time. Such features could prove useful in myriad situations and provide benefits for players that are unable to speak or speak clearly and/or can save valuable time in providing messages to players that may be offline or otherwise unavailable. For example, a player might wish to deliver the same voice mail message to many other players or player characters, whether or not such player or player character is presently available. For example, a player may record the phrase "pay your bills" and translate such phrase into a celebrity voice, such as Mr. T, and then deliver the message via e-mail, voice mail, or other communications, such as via an NPC or anytime such player comes into contact with any other player that owes such first player money or is overdue in paying such amounts when due. Voice Phrases can also be hyperlinked to keyboard keys. A player can press the key to have the phrase spoken in the game environment.

As stated above, a saved game result may be used to create a movie. The movie may or may not use text, spoken audio, or both. When creating a movie out of or from part or all of a saved game result, the player can convert text entries used in the saved game into audible voice files. A license fee to use the synthetic voice files created from the real voice files of a celebrity can be charged the player, for example, as a flat fee, a monthly fee, an upfront fee, or based on the amount of language that is created and/or the situations or frequency that the voice is used. In the case more than one player is making use of the same celebrity voice, such fees could be based in whole or in part upon the total amount of usage. The fee can be charged when the file is created or when it is heard by third parties or a combination of these factors.

According to another embodiment, players can also assign voices to other players and thereby alter the sounds made by those players, either as they hear themselves and/or as others hear them. For example, when other players speak to the player, they speak in voices specified by the player on his video game console, or, in some embodiments, on all player consoles. In some embodiments, the ability to alter the voices of other players on both the player machine and other player machines requires the use of the avatar alteration system disclosed above.

The voice to text and text to voice software and/or synthesized voices or other data can be stored on the game server or on the video game consoles or on any other suitable computing device and/or storage device(s). If the voice software and/or voices are stored on the game server, that server may convert some or all the files and transmits them to the game consoles or where and when needed. If the voice software, voices and/or data is stored on the game consoles, the game server can transmit, for example, the original text and or voice files to the consoles where they are converted to new voice files and played for the player.

For purposes of this disclosure, the game console may include or be in the form of a headset (or any combination of hardware) capable of receiving and transmitting voice files generated from players.

According to various embodiments, exemplary character attributes that could allow the character to speak in a certain synthetic voices include, but are not limited to:
1. Obtaining or failing to obtain a certain score in the game
2. Solving or failing to solve a certain puzzle in the game
3. Obtaining or failing to obtain a certain level in the game
4. Acquiring or failing to acquire a certain virtual item in the game
5. Obtaining or failing to obtain a certain peer score in the game.
6. Paying or failing to pay an extra fee for the right to have access to certain synthetic voices
7. Having a player account for a certain period of time
8. Purchasing a character expansion pack for the game.
9. Helping or failing to help other player's in the game obtain certain attributes for their characters
10. Being or not being a member of a certain group of players
11. Fulfilling a virtual obligation
12. Failing to fulfill a virtual obligation
13. Any combination of the forgoing and/or achieving or failing to achieve a game objective and/or within a prescribed time.

According to another embodiment, the present disclosure provides for a celebrity voice auction. In this embodiment, players bid for the celebrity synthetic voice they want (e.g., Robin Leach, James Earl Jones). A certain number of the highest bidders may then be given the exclusive use of the voice for a fixed time period or number of sessions. According to some embodiments, winning bidders can resell the right to use the voice on an exchange. Auctions can be conducted within the game, or via an external website.

Alternatively, rather than bidding for available voices, Players can bid for the voice they want even if that voice is not offered on the game. The bids can be guaranteed (eg by a credit card), so the demand they reflect is real and actionable. Thus, the total demand can be quantified and used to prompt players to make their voices available in the game.

According to one embodiment, the auction provider and or the game environment provider can split the revenues generated from the auctions with the voice copyright owner based on predefined, contractual rules and conditions.

According to another embodiment, the first 100 players to sign up for a voice backed by their credit cards, where the voice is not offered on the system yet, can get a percentage of the total fees once the celebrity later provides the voice and the game starts generated fees for that voice.

According to yet another embodiment, a player or player character may earn the right or possess a skill that allows him to transfer, e.g., receive or pass on an obligation from an avatar to another avatar.

According to yet another embodiment, the present disclosure provides a mechanism by which avatars may be altered as punishment for failure to fulfill a financial obligation. In the event a player character defaults on a virtual or real loan, or any other virtual or real obligation the credit card issuer, bank or other player character or entity holding the note, or obligation may opt to transfer part or all of such obligation to another player character, bank, or other lending institution, any or all of which may serve as a collection agency.

The collection agency may pay the note holder an up front virtual or real cash fee in exchange for the potential future value of the final (expected or actually) collected amount, i.e., a discount payment or other amount for the "transfer of paper", and/or may remit a percentage of the final collected amount to the note holder and retain the balance for its efforts. The collection agency may also take possession of the liens on any real or virtual property and/or take actual possession of same and either hold it until paid (i.e., akin to a pawn shop) and/or sell the assets to recover part or all of the loan.

According to some embodiments, when a player character signs up for a virtual credit card or enters into any other indebtedness or note, he may also be required by the lender to agree to permit such a transfer of his obligation, or other terms and conditions, whether for collections on a default or otherwise. For example, prior to entering into an obligation secured by a credit card, a player may be required to agree to any of several terms and conditions that might better enable the lender and/or a collection agency or other third party to collect any debts when due, including any one or more of, for example, agreement to: a) permit a certain portion of future game play fees to be allocated toward repayment of any such obligations, e.g., if a player pays $20 per month to play a game, which fee provides 20 hours of play, and such player fails to pay an obligation when due, in addition or instead of other collections options, such player may be forced to forfeit a certain number of hours and dollars until such time as the obligation is repaid, e.g., $10 per month could go toward repayment and, in such case, the player might also forfeit 10 hours of game play or some other number of hours, e.g., 5 or 15 hours, which difference might be determined and/or agreed to ahead of time and/or might be imposed and/or negotiated among the parties at the time of or generally around the time of the default or at such other time(s) as agreed to by the interested or affected parties, b) provide indentured service at a specified or determined hourly rate, until such obligations are repaid in part or in whole, c) agree to provide help or other services to other players, d) agree to the creation of a collection NPC or "mother hen" that may follow and harass the player until such time as the obligation is fulfilled, e) and/or any other term and condition, including, for example, to incur additional penalties and/or interest or an increased interest rate on any amounts outstanding.

Selling Virtual Loan Paper-In this embodiment, a holder of a note or other indebtedness or obligation may sell or assign part or all of such loan or other debt or obligation in exchange for a portion or all of such note or obligation. In this way, lenders may reduce their risk and/or free up their credit lines so that they can focus on securing new loans. Virtual loan paper sold in this manner can be accomplished via a virtual contract.

In an alternate embodiment, rather than selling the obligation to a collection agency, a first player who has a contracted to an obligation that was not fulfilled, in whole or in part, by a second player can hire a third or additional player character(s) or NPC(s) that is/are a collection agent who will follow and otherwise harass the second player until the obligation is settled. The NPC or player character who performs the role of collection agent can automatically receive all or a percentage of the settled obligation. The settlement amount or percentage can be determined based on system rules or a virtual contract established between the first player and the collection agent character, whether player or computer controlled. Payment for the settlement of the obligation can be paid (i) to the collection agent, who would then remit the appropriate share of the settlement to the first player (ii) to the first Player, who would then remit the appropriate share of the settlement to the collection agent; or (iii) to a virtual arbiter who distributes the money based on the rules or contract between the first player and the collection agent.

The second player character or virtual collection agency can hire a loan officer that is an NPC or other player character to pursue and/or harass the first player character and attempt to force payment from him. The hiring of such a character can be included as part of the avatar alteration clause of the initial agreement between the two virtual parties.

Alternatively or additionally, the bank could have NPC loan officers that it sends out to follow a player character with a delinquent loan. For example, the delinquent player character would be followed by that NPC until he had paid his loan to the bank and perhaps for a longer period to notify new would be lenders of such delinquent player's poor payment record. NPC loan officers can be a class of NPC that can be created and or purchased or rented or leased in a limited quantity and or that can only be operated with a virtual license. Such licenses can be controlled and issued in limited or unlimited quantities by a game environment administrator or virtual government official. Management and purchase of loan officer NPCs may require that a virtual entity has certain skills or other game attributes.

According to various embodiments, an avatar's appearance may be altered if there are any loans, outstanding loans, bad debts or late payments and/or based upon, in whole or in part, the player character's real or virtual credit score. For example, the avatar may have a "ball and chain" attached to its leg if there is a loan. The number, length, size or color of the ball and chain may be modified depending upon the number, size, length, interest rate, payment performance, etc., of the player character's outstanding loans, and/or current virtual credit score. In this manner, other player characters could easily determine the current credit worthiness of any given player character. Virtual Collection agencies may be the only virtual entities allowed to apply such alterations to a player character. In certain embodiments, only players that have paid a fee and/or have certain qualifications or skills may be able to see such player character alterations (of themselves and/or other players/player characters). For example, players that have paid a $10 per month fee, are able to see any such player character or avatar alterations of either themselves and/or other players or player characters or avatars.

In certain embodiments, Virtual Collection agencies may be required to have a permit or pay a fee to do business in the virtual environment. The permit entitles collection agency to purchase or otherwise pursue collection of delinquent obligations and apply alterations to player avatars, e.g., until delinquent obligations have been fulfilled. Permits to run a virtual collection agency may be limited to a certain quantity in a game environment or group of game environments. Permits for such a business can be transferred on an exchange once they have been issued. In an embodiment, to qualify for a Collection Agency permit, a virtual entity must pass certain real world or virtual world criteria.

For obligations that do not have a virtual cash value, the system or the player can determine a virtual cash value for the obligation that the collection agency must pay all or a portion of in order to take over the obligation. The system can determine the valuation of an obligation by retrieving historical or current exchange values for similar obligations from a virtual exchange and/or such determination may be made by any applicable means, including, for example, free market forces.

According to an embodiment, the bank can request that a player character with a delinquent loan be jailed if he is late with or otherwise fails to make his payments when or as due. NPC or player bounty hunters can be hired to capture and jail delinquent player characters. The system can flag a player character account as delinquent, and bounty hunters can only capture avatars with such a delinquent status flag or other indication. NPC bounty hunters can be a class of NPC that can be created and or purchased in a limited quantity and or that can only be operated with a virtual license. Such licenses can be controlled and issued in limited or unlimited quantities by a game environment administrator or virtual government official. Management and purchase or license or rental of bounty hunter NPCs may require that a virtual entity has certain skills or other game attributes and/or may require the payment of a fee and/or a percentage of any amounts collected by any such NPC.

Player characters who elect to become bounty hunters or collection agents may require a permit, license, skill level, or game attribute to do so. Control, issuance, creation, and monitoring of such permits, licenses, skill levels, or game attributes can be managed by a game environment administrator or virtual government official. In certain embodiment, such permits, licenses, skills and/or attributes may require the payment of a fee and/or a percentage of any amounts collected. Fees may be based on the amounts due, the payment history or creditworthiness of the delinquent player/player character, prior defaults and/or difficulties posed and/or time required in previous defaults to collect debts from such defaulting party, and/or any combination of the forgoing.

According to various embodiments, bounty hunters can agree to capture a fugitive character who has an outstanding obligation based on a virtual contract that specifies real or virtual cash payment for fulfilling the obligation of capturing the delinquent NPC. Such payment or fee may be fixed or variable. For example, a bounty hunter might charge a flat fee while another bounty hunter might charge based upon a percentage of the expected or actual amounts collected/recovered.

In certain embodiments, a player character with one or more delinquent loans, may be limited in his ability to move within the game environment and/or may be limited in game access or may be otherwise restricted in any predetermined, or negotiated fashion. For example, he may be precluded from returning to a town in which is located a creditor, such as a bank, to whom he owes money or has been delinquent in payment.

According to various embodiments, collection agencies and/or bounty hunters or other parties (real or virtual) can bid against each other to take over an obligation that a bank or game server posts as available for assumption. Once an obligation has been taken over or otherwise assumed by a collection agency, the agency may be granted access to alterations that they can apply to the avatar of the character, e.g., visible alterations and/or voices, etc. Delinquent Contracts can be posted on an exchange where they can be purchased individually or in bundles by competing virtual collection agencies, bounty hunters and/or other agencies/third parties.

According to another embodiment, the present disclosure provides methods and systems related to a declaration of bankruptcy by a character. According to this embodiment, games, players, or other entities may establish rules and conditions under which a player or one or more player characters may declare bankruptcy. The effect of a bankruptcy may be any one or more of the following, including, but not limited to:

1. Temporary or lifetime banishment from the game. For the player character or for the player, or any other player account created with the same billing or personal information provided.
2. A required repayment of all or a percentage of debts owed plus interest and/or penalties to those who suffered from the bankruptcy before a player character can play in the game again.
3. A flag set to require cash payments to continue play, plus some additional amount which will payoff part or all or more than the outstanding debt, and/or interest and/or penalties, over time
4. A complete or partial forgiveness of debts.
5. Real debts, e.g. those secured by a credit line, are, in certain embodiments, less likely to be partially or completely forgiven, whereas artificial debts, e.g., promise to provide a service, may be more easily relieved.

According to an embodiment, bankruptcy can be allowed and/or occur or result from a virtual Court Order. In certain embodiments, during the period, or some other time after/that a player is bankrupt, his avatar (for one or more or all avatars) can be altered to indicate his bankruptcy and/or prior bankruptcy and/or impending bankruptcy. In some embodiments, in order for the player character to get out of bankruptcy he must complete the obligations specified by the court and can then reappear in court so that they can rule that the obligations have been fulfilled. Alternatively, the game server itself can determine that the obligations have been fulfilled without the character needing to reappear in virtual court to receive a ruling.

The bankruptcy rules can be created by the game server administrator and/or by one or more players or NPC groups. For example a player character in a certain guild, family, or who is a citizen of a certain virtual government must abide by the rules and courts of that virtual entity when filing for virtual bankruptcy in the game.

According to an embodiment, if one or more characters associated with a player account is bankrupt, his alterations can be applied to other characters associated with the same player account, or to other accounts created and secured by the same real world financial account identifier.

When determining the rules for allowing a player to get out of virtual bankruptcy, the system can generate a list of some or all virtual obligations and assign a priority score to each one based on factors such as, but not limited to:

1. Whether the obligation is secured by a real or virtual world account
2. The virtual world value of the obligation
3. The real world value of the obligation
4. The date the obligation was secured 5. The date the obligation is due
6. The remaining balance of the obligation
7. The status or type of the virtual entity to whom the obligation is due
8. Any combination of the forgoing According to an embodiment, a bankruptcy mediation tool can be used to settle with all the debtors of the bankrupt player. The player can list all the obligations in the tool and transmit settlement offers to all or some of the debtors using the mediation tool. Debtors can accept, reject, or counter offer the offers made by the bankrupt player. The mediation tool can charge fees to the bankrupt player and the debtors to negotiate and resolve the obligations.

According to an embodiment, when a player is in virtual bankruptcy, all or a portion of the revenues his avatars and virtual businesses generated can be placed in a bankruptcy escrow account so that he cannot access them until an agreed upon or other portion of or all of his obligations have been paid.

According to another embodiment, periodic status reports can be sent to the bankrupt player and/or his creditors notifying some or all of them of the progress the bankrupt player has made or is making to fulfill all or part of his obligations to get out of bankruptcy.

According to yet another embodiment, alerts can be sent to the bankrupt player and his creditors when the player has fulfilled all, a portion, or a percentage of his obligations to get out of bankruptcy.

Furthermore, as the player fulfills obligations to get out of bankruptcy, his virtual credit score and history can be automatically updated with progress and adjusted accordingly.

According to some embodiments, an artificial intelligence system, e.g., a genetic algorithm, or other program can track player behavior and flag character accounts that have activity which puts them at risk for bankruptcy. The at risk player and the virtual and real entities to which he has one or more virtual obligations can be notified that the player is at risk when the system determines he is at risk. Measures can be taken by the system to limit the odds that the player will go bankrupt including:
1. Placing all or a percentage of his income in an escrow account that can be used only to pay for existing virtual obligations
2. Disallowing the character from entering into any other virtual contracts until he is deemed to be "not at risk"
3. Notify, e.g., via an alert, one or more lenders/creditors so that they might become involved, e.g., offer debt consolidation loans and/or extend the term or modify the interest rates of any existing loans.

According to various embodiments, characters owned by the same player may have linked risks. In other words, characters at risk can put all the characters owned by the player or secured by the same real or virtual world account at risk.

According to an embodiment, risk factors and past financial behavior can be used to determine whether or not a particular player is allowed to create a new character, access a metaverse, or engage in any other behavior. For example, real or virtual world financial account identifiers and player personal information such as name, address, phone number, user id, handle, bank or credit card numbers, and/or SON, that have been associated with bankrupt players in the past and/or within one or more other video games, which games may share information between or among them, who did not fulfill their obligations to get out of bankruptcy can be automatically excluded from creating new player accounts in the game environment or other game environments and/or may require such player to provide a special one time or recurring payment and/or may impose tighter lending conditions on such players, e.g., higher interest rates, shorter repayment periods, increased collateral obligations and/or other more restrictive financing terms and/or conditions.

Those having skill in the art will recognize that there is little distinction between hardware and software implementations. The use of hardware or software is generally a choice of convenience or design based on the relative importance of speed, accuracy, flexibility and predictability. There are therefore various vehicles by which processes and/or systems described herein can be effected (e.g., hardware, software, and/or firmware) and that the preferred vehicle will vary with the context in which the technologies are deployed.

At least a portion of the devices and/or processes described herein can be integrated into a data processing system with a reasonable amount of experimentation. Those having skill in the art will recognize that a typical data processing system generally includes one or more of a system unit housing, a video display device, memory, processors, operating systems, drivers, graphical user interfaces, and application programs, interaction devices such as a touch pad or screen, and/or control systems including feedback loops and control motors. A typical data processing system may be implemented utilizing any suitable commercially available components to create the gaming environment described herein.

Accordingly, the presently described system may comprise a plurality of various hardware and/or software components such as those described below. It will be appreciated that for ease of description, the variously described hardware and software components are described and named according to various functions that it is contemplated may be performed by one or more software or hardware components within the system. However, it will be understood that the system may incorporate any number of programs configured to perform any number of functions including, but in no way limited to those described below. Furthermore, it should be understood that while, for ease of description, multiple programs and multiple databases are described, the various functions and/or databases may, in fact, be part of a single program or multiple programs running in one or more locations.

Exemplary programs include:

Game Server programs:
1. Game Program—this program allows a game or virtual environment to exist and operate.
2. Alteration Set Up Program—this program allows a game administrator to set up possible alterations and it also allows a player to set up their own alterations.
3. Contract Program—this program allows players and game administrators to set up contracts. It also monitors and manages these contracts once they are created
4. Alteration Implementation Program—this program allows specified alteration be attached onto virtual contracts. It also implements an alteration on an avatar based on the contract terms and conditions.
5. Administration Program—this program allows a game administrator to manage the game program
6. Court Program—this program facilitates a group of court members who are players to have court sessions and issue court orders.
7. Alteration Optimization Program—this program optimizes the list of available alterations based on success criteria.
8. Alteration Transfer Program—this program allows an alteration to be transferred to one avatar to another.

9. Alteration Obligation Program—this program allows alterations to be applied or removed based on virtual contract obligations. Such applications can occur automatically or manually.
10. Voice to Text Program—this program converts player voice into text that can be displayed in conjunction with the player's avatar.
11. Text to Voice Program—this program converts conversational text in a game environment into synthetic or other voice files that are played in the game environment or on player consoles connected to the game environment.
12. Game Databases—all databases associated with the game and the disclosed invention are stored on the game server or other servers that communicate with the game server.
13. Saved Game Editor Program—this program allows players to edit saved game files and turn them into still images or movies
14. Billing Program—this program tracks player activity and bills players based on their activity
15. Virtual Collection Program—this program administers, facilitates, and monitors collection activity in the game such as permitting collection agents and agencies, creating and fulfilling collection contracts, and settling fulfilled collection contracts.
16. Bankruptcy Program—this program establishes obligation and limitation parameters for bankrupt players and players at risk of being bankrupt. The program also facilitates mediation for bankrupt players and allows a player to emerge from virtual bankruptcy if he has fulfilled obligations.
17. License and Permit Program—this program allows for licensing and permitting of players and player characters such as collection agent licenses, bounty hunter licenses, alteration licenses, and loan officer licenses.
18. Contract Exchange Program—this program facilitates the exchange of contracts from one player or group of players to another player or group of players.
19. Communication Program—this program allows the game server to communicate with the player via the game console, headset, and other hardware that can receive alerts.
20. Smell Generation Program—this program uses ingredients and recipes to create and deliver smells via a smell generating device
21. Smell Generation Device—this devices combines smell ingredients and disburses one or more smells when and as directed by a smell generation program Game Console (PC or Xbox, or Playstation)
1. Game Program
2. Communication Program
3. Game Databases Headset
1. Communication Program Bank Server
1. Virtual Collection Program
2. Bank Databases Exemplary database architectures include:

Player Database
1. Player ID
2. Player Name
3. Player Address
4. Player Billing Information
5. Player Character ID(s) 1-N
6. Account Setting(s) for Voice-to-Text option(s)
7. Player Personal Information
8. Real World Credit Score
9. Player Characters 1-n
10. Player Status
11. Conditions Necessary to Change Status
12. Credit Score Player Character Account Database
1. Player Character ID
2. Account ID
3. Obligation ID 1-n
4. Character Attributes 1-N
5. Character Setting(s) for Voice-to-Text option(s)
6. Saved Game Result(s) 1-N
7. Character Credit Score
8. Character Assets and Attributes
9. Character Obligations
10. Obligation Status
11. Character Status
12. Conditions Necessary to Change Status
13. Avatar 1-N Avatar Database
1. Player ID
2. Character ID
3. Avatar ID
4. Avatar Appearance
5. Avatar Voice
6. Avatar Smell ID 1-n
7. Smell Use Rule
8. Smell Use Fee
9. Avatar Attributes 1-n Smell Ingredients Database
1. Ingredient ID
2. Name
3. Description
4. Uses 1-n
5. Limitations 1-n
6. Cost Basis
7. Price Smell Recipe Database
1. Smell ID
2. Name
3. Description
4. Ingredients 1-n
5. Ingredients quantities Smell Use Rules Database
1. Rule ID
2. Name
3. Description
4. Rules 1-n
5. Fees for use Obligation Database
1. Obligation ID
2. Player Character ID
3. Obligation Penalties
4. Obligation Terms and Conditions
5. Obligation Penalties
6. Obligation Rewards Available Synthetic Voice Database
1. Synthetic Voice ID
2. Synthetic Voice Description
3. Synthetic Voice Alphabet and Sample Words Voice Rules Database
1. Voice File ID
2. Rules for using file Character Voice Configuration Database
1. Text Snippet
2. Voice file associated with Text Snippet
3. Rules for speaking text snippet 4. Fee for using text snippet
Saved Game Result Database
1. Saved Game ID Number
2. Saved Game File
3. Saved Game Status (raw, recompiled, edited
Movie Files Database
1. File ID
2. Creator ID
3. Creation Date
4. Associated Players
5. Associated Characters
6. Associated Alterations
7. File Attributes 1-n
Collections Agency Database
1. Collections Agency ID
2. Collections Agency Permit Number
3. Collections Agency Descriptor
4. Collection Types
5. Penalty Types
6. Collection Methods
Obligation Status Database
1. Obligation Status ID
2. Obligation Status Descriptor
3. Obligation Status Actions
4. Allowable Alterations
Collections Database
1. Collection ID
2. Collection Agency ID
3. Player Character ID
4. Penalty Method
5. Collection Terms and Conditions
Bankruptcies Database
1. Bankruptcy ID
2. Status
3. Conditions to Change Status
4. Character ID
5. Player ID
Emerge from Bankruptcy Conditions Database
1. Condition ID
2. Condition Descriptor
Declare Bankruptcy Conditions Database
1. Condition ID
2. Condition Descriptor
Allowable Penalties Database
1. Penalty ID
2. Penalty Descriptor
3. Penalty usage rules
Penalty Conditions Database
1. Condition ID
2. Applicable Penalty ID 1-n
Penalty Database
1. Contract ID
2. Penalty ID
3. Obligation ID
4. Player ID 1-n
5. Avatar ID 1-n
6. Character ID 1-n
Contract Database
1. Contract ID
2. Contract File
3. Obligation ID 1-n
4. Player ID 1-n
5. Player Type 1-n
6. Character ID 1-n
7. Character Type 1-n
8. Avatar ID 1-n
9. Avatar Type 1-n
10. Contract Type
Alteration Database
1. Alteration ID
2. Alteration Descriptor
3. Alteration File
4. Alteration Rules
Alteration Fee Database
1. Fee ID
2. Fee Type
3. Fee Terms and Conditions
4. Alteration ID
5. Alteration Type
Alteration Permit Database
1. Permit ID
2. Alteration ID
3. Fee ID
4. Alteration Terms and Conditions
Single or Limited Use Alteration Database
1. Alteration ID
2. Alteration Type
3. Alteration Use
4. Number of times used
5. Amount of time used
6. Amount of times remaining to be used
7. Amount of time remaining for use
Alteration Attributes Database
1. Attribute ID
2. Attribute Descriptor
3. Alteration ID 1-n
4. Attribute Rules and Conditions
Alteration Skills Database
1. Skill ID
2. Skill Descriptor
3. Alteration ID 1-n
4. Alteration Rules and Conditions
Alteration Game Parameters Database
1. Game Parameter ID
2. Game Parameter Descriptor
3. Alteration ID 1-n
4. Alteration Rules and Conditions
Alteration Rules and Conditions Database
1. Rule/Condition ID
2. Rule/Condition Descriptor
Alteration Right Database
1. Right ID
2. Right Descriptor
3. Alterations 1-n
Alteration Owner Database
1. Owner ID
2. Alteration ID
3. Fee ID
Alteration Permissions Database
1. Permission ID
2. Player ID 1-n
3. Character ID 1-n
4. Administrator ID 1-n
5. Permission Descriptor
6. Alteration ID 1-n
Billing Database
1. Billing ID
2. Fee ID
3. Transaction ID
4. Player ID 1-n
Contract Type Database
1. Contract Type ID
2. Contract Descriptor 1-n
3. Contract 1-n Character Relationship Database
1. Group ID
2. Character ID 1-n
3. Group Type 1-n
Player Relationship Database
1. Group ID
2. Player ID 1-n
3. Player Type 1-n
Court Member Database
1. Court ID
2. Player ID 1-n
3. Character ID 1-n
4. Avatar ID 1-n
5. Player Title 1-n
6. Character Title 1-n
7. Avatar Title 1-n
Court Session Database
1. Session ID
2. Court ID
3. Court Members 1-n
4. Session Date
5. Session File
6. Related Court Orders 1-n
Court Order Database
1. Court Order ID
2. Court ID
3. Session ID
4. Order Contract
5. Order Obligations
6. Player ID 1-n
7. Character ID 1-n
8. Avatar ID 1-n
9. Alteration ID 1-n
10. Order Terms and Conditions 1-n
Third Party Sponsor Database
1. Sponsor ID
2. Sponsor Type
3. Player ID 1-n
4. Character ID 1-n
5. Sponsor ID 1-n
6. Sponsor Attributes 1-n
7. Sponsor Alterations 1-n
8. Sponsor Conditions 1-n
9. Sponsor Obligations 1-n
Collection Agent Database
1. Agent ID
2. Agent Type
3. Player ID
4. Character ID
5. Avatar ID
6. Permit/License Number
Bounty Hunter Database
1. Hunter ID
2. Hunter Type
3. Player ID
4. Character ID
5. Avatar ID
6. Permit Number
7. Permit/License Number
Lender Database
1. Lender ID
2. Lender Type
3. Player ID 1-n
4. Permit/License Number
Collection Contract Database
1. Contract ID
2. Contract Obligations
3. Contract Alterations
4. Collection Agent ID
5. Player ID 1-n
6. Settlement Details
7. Status
8. Virtual Entity ID 1-n
9. Contract Value
Bounty Contract Database
1. Contract ID
2. Contract Obligations
3. Contract Alterations
4. Hunter ID
5. Player ID 1-n
6. Settlement Details
7. Status
8. Virtual Entity ID 1-n
9. Contract Value
Settlement Database
1. Contract ID
2. Contract Type
3. Settlement ID
4. Settlement Amount
5. Amount due 1-n
6. Virtual Entity 1-n
Settlement Offers Database
1. Contract ID
2. Offer ID
3. Offer Amount
4. Offer terms and conditions
5. Virtual Entity ID
Loan Officer Database
1. Officer ID
2. Officer Type
3. Player ID
4. Character ID
5. Avatar ID
6. Permit Number
7. Permit/License Number
Contract Exchange Database
1. Exchange ID
2. Contract ID 1-n
3. Contract Value
Exchange Transactions Database
1. Exchange ID
2. Contract ID
3. Contract Settlement Price
4. Buyer ID
Bankruptcy Database
1. Player ID
2. Character ID
3. Avatar ID
4. Bankruptcy ID
5. Bankruptcy Descriptor
6. Rule ID 1-n
Bankruptcy Rules Database
1. Rule ID
2. Rule Descriptor
3. Rules Terms and Conditions
Court Order Database
1. Order ID
2. Order Details
3. Court ID
4. Session ID
5. Order Obligations 1-n
6. Order Alterations 1-n
7. Player ID 1-n
8. Character ID 1-n 9. Avatar ID 1-n
Escrow Database
1. Escrow ID
2. Contract ID
3. Obligation ID
4. Escrow Attributes 1-n
Player Credit Score Database
1. Score Qualifier 1-n
2. Score Amount
3. Score Descriptor
4. Total Score
Alert Settings Database
1. Alert ID
2. Alert Descriptor
3. Alert Conditions
Alert Database
1. Player ID
2. Alert ID 1-n It will be appreciated that the various software and hardware components described above will be configured to perform a variety of functions and methods. Listed below are some exemplary methods that might be performed by the systems as described herein:

Create Contract with Penalty or Reward Alterations
1. Receive a request to create a contract from a player
2. Create a new contract record
3. Determine and output eligible alterations
4. Receive alteration selection
5. Store alteration with contract record
6. Output contract
7. Receive agreement for contract from all parties Initiate Penalty Protocol (Apply Alteration to Avatar (automated)

Fulfill Obligation to Neutralize Penalty Protocol (Remove Alteration from Avatar)
1. Receive an indication that an obligation has been fulfilled
2. Determine if an alteration has been applied to an avatar
3. Remove alteration Alteration Creation
1. Receive a request to create an alteration
2. Determine if virtual entity qualifies to create alteration
3. Receive alteration, including fee to use alteration
4. Determine fee for creating alteration
5. Charge fee to virtual entity Apply Alteration to Avatar (manual)
1. Determine that an obligation of a contract has not been fulfilled
2. Determine if obligation has a corresponding alteration
3. Output alert to virtual entity that obligation has not been fulfilled and request that alteration be applied
4. Receive request to apply alteration
5. Alter Avatar according to alteration
6. Apply Alteration Fees
7. Receive a request to create, attach to a contract, apply to an avatar, or remove from an avatar an alteration
8. Perform alteration action
9. Determine fee for alteration action
10. Charge alteration fee to appropriate virtual entity Court Determines Delinquency and Obligation
1. Receive a request to review a contract
2. Create a court session
3. Receive a court order, including obligations and alterations
4. Apply alterations to virtual entities as appropriate Record and Store Virtual Activity
1. Receive an indication of virtual entity activity
2. Record Activity
3. Store activity Enhance Alterations Based on Performance
1. Apply alterations to virtual entities
2. Measure performance of entity with alteration
3. Store performance
4. Determine optimal alterations based on subsequent performance
5. Store alterations based on optimization Reverse Court Ruling/Fulfill Court Order
1. Receive an indication that an obligation associated with a court order has been completed
2. Determine if an alteration is associated with the court order
3. Remove alteration from avatar Reveal Alteration
1. Generate an alteration request
2. Apply alteration to avatar
3. Display avatar with alteration Purchase limited use alteration
1. Receive a request to purchase an alteration
2. Determine if virtual entity qualifies to purchase alteration
3. Receive Payment
4. Issue Alteration ID to Player Use limited use alteration
1. Receive a request to use an alteration
2. Determine if alteration still has usage sessions or time available
3. Determine if requested use is eligible for alteration
4. Issue alteration for use and apply alteration to specified avatar Transfer Alteration Right
1. Receive a request to transfer an obligation
2. Determine if alteration can be transferred
3. Transfer alteration Transfer Obligation
1. Receive a request to transfer an obligation
2. Determine if alteration can be transferred
3. Transfer obligation Alter Other Character Voice
1. Receive an indication that an obligation has not been met
2. Determine if alteration allows voice of other character to be altered
3. Alter voice of character Earn right to Apply Alteration
1. Receive indication that a virtual activity has been performed, or a game parameter has been completed by a virtual entity
2. Determine if alterations apply to activity or parameter
3. Allow alteration to be used by virtual entity Sell Virtual Paper
1. Receive a request to sell a virtual contract
2. Determine if contract can be transferred
3. Post Contract on Exchange
4. Receive request to buy contract
5. Transfer contract to virtual entity
6. Charge fees to virtual entities related to/involved with transaction Create Collection Agent Contract
1. Receive an indication that an obligation has not been fulfilled
2. Generate a collection contract
3. Generate and output a list of appropriate collection agents
4. Receive a selection of collection agents
5. Output contract to agent selection 6. Receive an acceptance of the contract from an agent
7. Assign contract to agent
8. Store Contract
9. Apply alterations to appropriate contract parties
10. Determine fees for creating contract
11. Charge fees to appropriate virtual entities Settle Collection Agent Contract
1. Receive a request to settle a collection contract
2. Receive a settlement amount
3. Determine if settlement amount settles contract
4. Remove alterations from appropriate contract parties
5. Retrieve settlement distribution parties
6. Determine settlement distributions and applicable fees
7. Allocate settlement distributions to appropriate parties
8. Distribute settlement allocation distributions to appropriate parties, less applicable fees Create Bounty Hunter Contract
1. Receive an indication that an obligation has not been fulfilled
2. Generate a bounty hunter contract
3. Generate and output a list of appropriate bounty hunters
4. Receive a selection of bounty hunters
5. Output contract to bounty hunter selection
6. Receive an acceptance of the contract from a bounty hunter
7. Assign contract to bounty hunter
8. Store Contract
9. Apply alterations to appropriate contract parties
10. Flag virtual entities as "eligible to be hunted"
11. Determine fees for creating contract
12. Charge fees to appropriate virtual entities Settle Bounty Hunter Contract
1. Receive an indication that a hunter contract has been fulfilled
2. Receive or Retrieve a settlement amount (the amount can be paid when the contract is fulfilled, or when the contract is created)
3. Determine if settlement amount settles contract
4. Remove alterations and "eligible to be hunted" status from appropriate contract parties
5. Retrieve settlement distribution parties
6. Determine settlement distributions and applicable fees
7. Allocate settlement distributions to appropriate parties
8. Distribute settlement allocation distributions to appropriate parties, less applicable fees Create Collection Agent
1. Receive a request to create a collection agent
2. Determine if a permit is available
3. Generate and Output permit price
4. Receive acceptance of price
5. Create Collection Agent
6. Assign permit to virtual entity
7. Charge permit price to virtual entity Create Bounty Hunter
1. Receive a request to create a bounty hunter
2. Determine if a permit is available
3. Generate and Output permit price
4. Receive acceptance of price
5. Create Bounty Hunter
6. Assign permit to virtual entity
7. Charge permit price to virtual entity Create Loan Officer
1. Receive a request to create a loan officer
2. Determine if a permit is available
3. Generate and Output permit price
4. Receive acceptance of price
5. Create loan officer
6. Assign permit to virtual entity
7. Charge permit price to virtual entity Create Loan Officer Contract
1. Receive an indication that an obligation has not been fulfilled
2. Generate a loan officer contract
3. Generate and output a list of loan officers
4. Receive a selection of officers
5. Output contract to officers
6. Receive an acceptance of the contract from an officer
7. Assign contract to officer
8. Store Contract
9. Apply alterations to appropriate contract parties
10. Determine fees for creating contract
11. Charge fees to appropriate virtual entities Settle Loan Officer Contract
1. Receive a request to settle all or a portion of a Loan Officer contract
2. Receive a settlement amount
3. Determine if settlement amount settles contract
4. Remove alterations from appropriate contract parties
5. Retrieve settlement distribution parties
6. Determine settlement distributions and applicable fees
7. Allocate settlement distributions to appropriate parties
8. Distribute settlement allocation distributions to appropriate parties, less applicable fees Distribute Settlement of Contract
1. Retrieve the settlement amount of a settled contract
2. Determine parties and percentage of settlement due to each party
3. Determine, Retrieve, or Generate settlement fees
4. Output settlement in appropriate percentages to appropriate parties, less applicable fees Issue Permits
1. Receive a request for a permit type
2. Determine if there are available permits
3. Generate a price for an available permit
4. Output price
5. Receive acceptance of price
6. Issue permit to virtual entity Flag Character as Delinquent
1. Receive an indication that a character is delinquent in fulfilling an obligation
2. Flag character account as delinquent Exchange Group or Single Contract
1. Receive a request to sell a single or group of contracts
2. Place contracts in escrow
3. Output request on exchange
4. Receive an offer to buy the single or group of contracts
5. Flag request to sell as "fulfilled"
6. Receive payment from buyer
7. Transmit payment to seller
8. Release contracts to buyer Banish Bankrupt Character
1. Receive an indication that a character or player is bankrupt
2. Generate a list of creditors of the player
3. Generate or receive a set of obligations to remove the bankruptcy status
4. Create bankruptcy contract from obligations and output contract bankrupt player and or creditors of bankrupt player
5. Flag account as bankrupt
6. Limit usage of account until obligations are fulfilled Disallow New Player Account based on Previous Player Bankruptcy 1. Receive a request to create a player account including player personal and billing info
2. Determine if request matches data of bankrupt player
3. Disallow creation of new player account if request matches data of bankrupt player Create Bankruptcy Settlement Offer
1. Receive an offer to settle a bankruptcy contract
2. Retrieve list of creditors and corresponding obligations
3. Output appropriate portion of settlement offer to appropriate creditors Review/Alter Bankruptcy Settlement Offer
1. Receive counter offers for portions of settlement offer from appropriate creditors
2. Output a counter offer to an offer to settle a bankruptcy contract Create Bankruptcy Escrow
1. Determine that a player is bankrupt
2. Generate a bankruptcy contract
3. Create a bankruptcy escrow account for player
4. Determine that a bankrupt player has created virtual wealth
5. Place virtual wealth in bankruptcy escrow account Alter Player when Obligation is fulfilled
1. Determine that a player has fulfilled an obligation
2. Determine if avatar of player has an alteration
3. Remove alteration from player if obligation is fulfilled Alert Player when Alteration is Applied
1. Apply alteration to player avatar
2. Retrieve/Generate alerts list
3. Transmit alert of alteration application to alerts list Alert Player when Alteration is Removed
1. Remove alteration from player avatar
2. Retrieve/Generate alerts list
3. Transmit alert of alteration to alerts list Update Credit Score of Player
1. Receive indication that obligation has been fulfilled or not fulfilled
2. Apply or remove alteration
3. Retrieve credit score of virtual entity
4. Generate new credit score
5. Store new credit score of virtual entity Find Likely Bankruptcy Candidates
1. Retrieve virtual entity activity
2. Determine if activity will lead to bankruptcy based on activity history of other bankrupt customers
3. Score virtual entity regarding bankruptcy likelihood Modify/limit Candidates for Bankruptcy
1. Retrieve bankruptcy score
2. Identify virtual entities likely for bankruptcy based on score
3. Limit activity of virtual entity based on rules and conditions to reduce the risk of bankruptcy Voice-Text
1. Receive voice recording
2. Convert voice recording into text
3. Display text in game
4. Save text in game result Text-Voice
1. Receive text (either typed or spoken text)
2. Retrieve synthetic voice selection
3. Convert text into synthetic voice selection
4. Output text using synthetic voice selection Voice-Text-Voice
1. Receive voice recording
2. Convert voice recording into text
3. Retrieve synthetic voice selection
4. Convert text into synthetic voice selection
5. Output text using synthetic voice selection Voice-Text-Editor
1. Receive voice recording
2. Convert voice recording into text
3. Save text with saved game result
4. Retrieve saved game result in game editor
5. Receive edited text from game editor
6. Output saved game with edited text (in poster or comic book format)

Text-Voice-Editor
1. Receive text of dialogue
2. Retrieve synthetic voice selection
3. Convert text into synthetic voice selection
4. Output text using synthetic voice selection
5. Save game result with synthetic voice selection
6. Retrieve saved game result in editor
7. Receive edited synthetic voice from game editor
8. Output saved game result with edited synthetic voice (in movie format)

Create Synthetic Smell
1. Receive Request for Smell Generation
2. Retrieve Smell Recipe
3. Combine Smell Ingredients per Recipe
4. Store or dispense smell Synthetic Voice/Smell Selection
1. Receive Player Log in
2. Determine character attributes
3. Determine Synthetic Voices/Smells Available for those character attributes
4. Output Available Voices/Smells
5. Receive Player Synthetic Voice/Smell Selection
6. Save Player Synthetic Voice/Smell Selection Synthetic Voice/Smell Obtained Upon Successful Completion of Game Criteria
1. Receive indication that Player completed Game Criteria
2. Determine if a Synthetic Voice/Smell is available for that Game Criteria
3. If Synthetic Voice/Smell is available, flag player account with access to Synthetic Voice/Smell.

Synthetic Voice Upsell
1. Receive player log in
2. Determine if synthetic voice/smell is available for that player
3. Output offer to use synthetic voice/smell
4. If offer is accepted store offer acceptance in player account
5. Activate Synthetic voice/smell for that player account.

Billing System For Using Synthetic Voice in Game
1. Determine if Player account used (or signed up for) synthetic voice
2. Retrieve fee for using synthetic voice
3. Retrieve player account information
4. Apply fee to player account Billing System For Using Voice to Text editor
1. Determine if player used editor to alter Voice to Text saved game results
2. Retrieve fees for using editor
3. Retrieve player account information
4. Apply fee to player account Billing System For Using Synthetic Voice in Editor
1. Determine if player used Text to Voice in Editor
2. Retrieve fees for using editor
3. Retrieve player account information
4. Apply fee to player account Set up conditions for obligation Transfer (when obligation is created)
1. Receive an obligation request from a player character 2. Determine conditions for obligation transfer (to a virtual collection agency)
3. Output conditions to the player character
4. Receive acceptance of conditions from the player character
5. Create Obligation for the player character Obligation Default
1. Determine that an obligation is in default
2. Retrieve conditions for obligation transfer
3. Transfer obligation to collection agency based on conditions Transfer of Obligation Offer
1. Determine that an obligation in default based on conditions
2. Output offer to transfer obligation to multiple collection agencies
3. Receive acceptance of offer from a collection agency
4. Transfer obligation to collection agency Establish Bankruptcy
1. Receive a request for a virtual bankruptcy or determine that a player and/or player character falls within allowable conditions of bankruptcy
2. Create virtual bankruptcy record
3. Determine and store conditions for player and/or player character to emerge from virtual bankruptcy
4. Set status of player and/or player character to bankrupt
5. Output conditions to emerge from virtual bankruptcy to player character Emerge from Bankruptcy
1. Receive a request to emerge from virtual bankruptcy
2. Output conditions to emerge from virtual bankruptcy
3. Receive indication that player or player character account has satisfied conditions
4. Change status of player and or player character account to not bankrupt Of course it will be appreciated that the systems methods described herein are provided for the purposes of example only and that none of the above systems methods should be interpreted as necessarily requiring any of the disclosed components or steps nor should they be interpreted as necessarily excluding any additional components or steps.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. §1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) another item in the enumerated list. For example, the enumerated list "a computer, a laptop, a PDA" does not imply that any or all of the three items of that list are mutually exclusive - e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

What is claimed is:

1. A method performed by a computing device, the method comprising:
running, by a Video Game Central Server, a massive multi player online game that is operable to simultaneously support a plurality of players via a plurality of video game devices,
in which each of the players controls at least one player character,
generating, by the Video Game Central Server, a respective avatar for each of the player characters;
receiving a request to create a binding agreement between a first player of the plurality of players and a second player of the plurality of players;
outputting a plurality of eligible alterations;
receiving, from the second player, a selection of at least one of the eligible alterations;
creating, by the Video Game Central Server, a binding agreement between the first player of the plurality of players and the second player of the plurality of players, wherein the first player agrees to undertake an obligation and receive a penalty in return for failure to meet the obligation; and
altering, by the Video Game Central Server, an avatar of the first player based on the player's fulfillment or failure to fulfill the obligation and based on the selected at least one alteration.

2. The method of claim 1 wherein the alteration is specified in the contract.

3. The method of claim 2 wherein the alteration is a penalty for the player's failure to fulfill the obligation.

4. The method of claim 2 wherein the alteration is a reward for the player's fulfillment of the obligation.

5. The method of claim 1 further comprising:
receiving, by the Video Game Central Server, a request from the second player to alter the first player's avatar due to the avatar's fulfillment or failure to fulfill an obligation.

6. The method of claim 1 wherein the alteration is to the physical appearance of the avatar.

7. The method of claim 1 wherein the alteration is to an audible quality of the avatar.

8. The method of claim 7 wherein the avatar has an audible voice and the alteration is to the avatar's voice.

9. The method of claim 1 wherein the avatar has a smell and the alteration is to the avatar's smell.

10. The method of claim 1 wherein the alteration is the presence of another character that follows the avatar.

11. The method of claim 1 wherein the type of alteration is selected by the player.

12. The method of claim 1 wherein the right to select the alteration can be transferred to another party.

13. The method of claim 1, further comprising:
receiving, by the Video Game Central Server, an indication that the obligation has not been fulfilled;
assigning, by the Video Game Central Server, the avatar of the first player to a virtual bounty hunter;
applying, by the Video Game Central Server, alterations to the avatars of the first player; and
flagging, by the Video Game Central Server, the avatar of the first player as eligible to be hunted.

14. The method of claim 13 further comprising:
determining, by the Video Game Central Server, that the bounty hunter has found a flagged avatar; and
rewarding, by the Video Game Central Server, the bounty hunter.

15. The method of claim 14 further comprising unflagging, by the Video Game Central Server, the found avatar.

16. The method of claim 14 further comprising restoring, by the Video Game Central Server, the found avatar to its pre-altered condition.

17. An apparatus comprising:
a non-transitory processor; and
a computer readable medium in communication with the processor;
in which the computer readable medium stores instructions which, when executed by the processor, direct the processor to perform a method comprising:
running, by a Video Game Central Server, a massive multi player online game that is operable to simultaneously support a plurality of players via a plurality of video game devices,
in which each of the players controls at least one player character, generating, by the Video Game Central Server, a respective avatar for each of the player characters;
receiving a request to create a binding agreement between a first player of the plurality of players and a second player of the plurality of players;
outputting a plurality of eligible alterations;
receiving, from the second player, a selection of at least one of the eligible alterations;
creating, by the Video Game Central Server, a binding agreement between the first player of the plurality of players and the second player of the plurality of players,
wherein the first player agrees to undertake an obligation and receive a penalty in return for failure to meet the obligation; and
altering, by the Video Game Central Server, an avatar of the first player based on the player's fulfillment or failure to fulfill the obligation and based on the selected at least one alteration.

* * * * *